United States Patent [19]

LaCoste et al.

[11] 4,235,416
[45] Nov. 25, 1980

[54] VIBRATION RESISTANT VALVE

[75] Inventors: Bernard L. LaCoste, Wilmington, Del.; Lloyd W. Smith, Nether Providence, Delaware County; Thomas J. Finnimore, East Nottingham Township, Chester County, both of Pa.

[73] Assignee: Westinghouse Electric Corp., Pittsburgh, Pa.

[21] Appl. No.: 959,042

[22] Filed: Nov. 8, 1978

[51] Int. Cl.³ .............................................. F16K 25/00
[52] U.S. Cl. ..................................................... 251/86
[58] Field of Search ........................ 251/84, 86, 87, 88

[56] References Cited

U.S. PATENT DOCUMENTS

| | | | |
|---|---|---|---|
| 1,009,763 | 11/1911 | Marsh | 251/86 |
| 1,165,197 | 12/1915 | Marsh | 251/86 |
| 1,787,236 | 12/1930 | Dopp | 251/88 |
| 2,998,957 | 9/1961 | Vulliez | 251/86 |
| 3,204,922 | 9/1965 | McInerney | 251/88 |
| 3,414,232 | 12/1968 | Hellman | 251/86 |
| 3,519,245 | 7/1970 | Hyde | 251/86 |

*Primary Examiner*—Martin P. Schwadron
*Assistant Examiner*—G. L. Walton
*Attorney, Agent, or Firm*—J. W. Keen

[57] ABSTRACT

A valve apparatus for controlling fluid flow therethrough. A valve support body attached to an elongated stem is housed in an internal opening of a valve body which is externally mateable with a valve seat. Mateable surfaces on the valve body and valve seat are spherical so as to ensure complete engagement therebetween for misalignments between the stem-supported valve body and the valve seat. An antivibration or stabilizing ring situated between the support body and the valve body within the internal opening permits rotation of the valve body about the support body during valve closure to compensate for large stem-valve seat misalignments while restricting relative oscillatory, vibrating motion between the support body and valve body when the valve is in the open, unengaged configuration. Maximum vibration resistance and free rotatability of the valve body is obtained by disposing the stabilizing ring to occupy a position in the plane formed by the contact line between the valve body and seat. A portion of the support body is spherical in shape so as to promote its mateability with a spherical surface which partially bounds the internal valve body opening. In the open, unengaged configuration, the valve body and valve support body are held in intimate contact at these spherical surfaces, by weight and pressure drop forces.

7 Claims, 4 Drawing Figures

VIBRATION RESISTANT VALVE

BACKGROUND OF THE INVENTION

1. Field of the Invention

This invention relates to fluid control valves, and more particularly, to means for providing valve-valve seat contact for valve-valve seat misalignments and for resisting valve vibration induced by fluid flowing therethrough when the valve is in an open, unengaged configuration

2. Description of the Prior Art

Large steam turbines often utilize individually actuated control valves to avoid vibration problems which occur with internal bar lift arrangements when the mass flow rate therethrough is greater than 300,000 pounds per hour. Use of individually actuated valves provides an acceptable solution if the maximum misalignment between the valve's stem and seat at the time of valve closing is not greater than 0.006 inch. Due, however, to the non-symmetric design of and differential temperatures between components thereof, integral extraction steam chests in steam turbines typically result in parallel misalignments between the valve's stem and the valve's seat of as much as 0.10 inch. Such misalignments may be partially explained by the non-symmetric design of the steam chest and the different effects the high pressure has on the structural members holding the stems and seats of the valves. Valve vibrational problems have, in the past, been reduced by utilizing guides about the valve's plug or body to prevent vibratory motion therein. Such guides are, however, not useful when misalignment between the valve plug and seat is a problem. It is, therefore, a necessity in certain circumstances to have control valves which satisfactorily operate under relatively large misalignments and are, simultaneously, resistant to fluidly imparted vibratory motion when in the open, unengaged configuration.

SUMMARY OF THE INVENTION

In accordance with the present invention, a control valve is provided which satisfactorily operates when normally mateable components thereof are subjected to relatively large operational misalignments and which is highly resistant to vibratory motion when the valve is in the open, unengaged position. The inventon generally comprises a stem structure which is axially displaceable between an open and a closed position, a valve seat structure having a spherical seat surface, a valve body which is rotatable on and displaceable with the stem structure which is partially housed within a valve body opening with a portion of the surface bounding the valve body's opening separated from a portion of the stem structure, and a stablilizing ring which extends into the separating space between the valve body and stem structure which restricts relative movement between the valve body and stem structure when the valve is unengaged with the valve seat and permits sufficient relative movement between the stem structure and valve body during valve-valve seat engagement to compensate for misalignments between the stem structure and valve seat.

BRIEF DESCRIPTION OF THE DRAWINGS

The invention will be more fully understood from the following detailed description of a preferred embodiment, taken in connection with the accompanying drawings, in which.

DESCRIPTION OF THE PREFERRED EMBODIMENT

The present invention is concerned primarily with control valve means for fluid utilizing machines. Accordingly, in the description which follows, the invention is shown embodied in an extraction steam chest for a steam turbine. It should be understood, however, that the invention may be utilized as a control valve structure in any apparatus through which fluid is required to flow.

Figure 1:
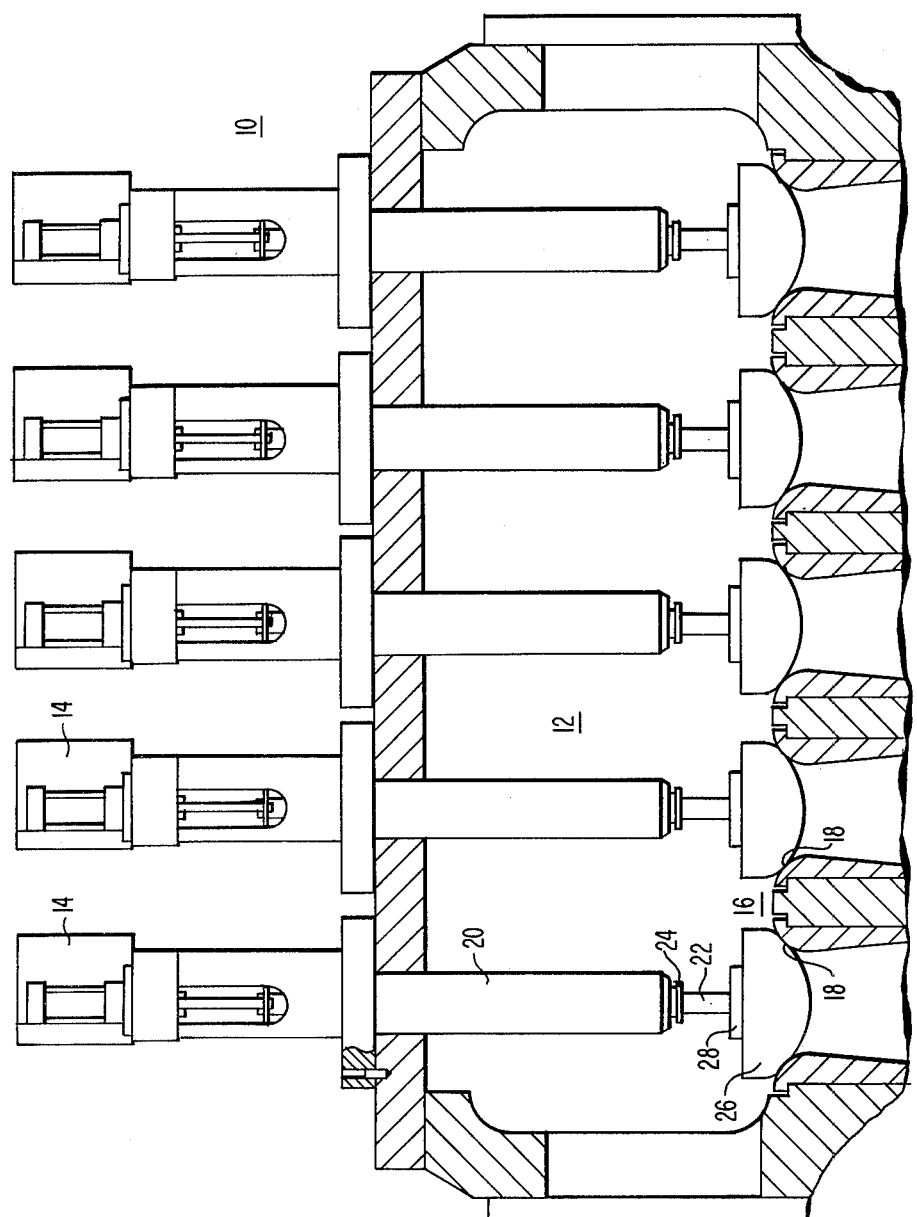
FIG. 1 is a partial transverse sectional view of an exemplary extraction steam chest in which the invention is incorporated.

In FIG. 1 the invention is shown, by way of illustration, disposed in the closed position within an extraction steam chest 10 which acts to maintain steam pressure being automatically extracted from a typical steam turbine for outside heating or other process work. Such pressure maintenance is provided by controlling the steam flow to exhaust, thus controlling pressure in the upstream extraction zone ahead of it. Extraction pressure demand may be manually adjusted but is customarily set by a control within the turbine's electrohydraulic controller (not shown). The individually actuated valves 12 are opened and closed by servo actuators 14 which regulate steam flow to exhaust so as to maintain the desired extraction pressure. Valve opening sequence and the extent each valve body 16 disengages from valve seat 18 are normally programmed functions of the electrohydraulic controller. Maximum extraction occurs when all valve bodies 16 are seated on valve seats 18 so as to prevent steam within the steam chest 10 from exhausting.

Valve stem guide 20 is disposed about each valve stem 22 within the steam chest 10. The valve stem bushing 24 is disposed in one axial end of valve stem guide 20 between the valve stem guide 20 and valve stem 22 so as to minimize undesired steam entry between valve stem 22 and valve stem guide 20. Due to temperature and pressure effects on steam chest 10, misalignment between valve stems 22 and associated valve seats 18 sometimes occur and must be compensated for to ensure successful engagement of valve body 16 with seat 18. Providing such ensurance typically necessitates an extraordinary amount of relative movement between stem 22 and valve body 16. Such relative freedom of movement adversely affects the valve's vibration resistance when it is in the open, unseated position.

Figure 2:
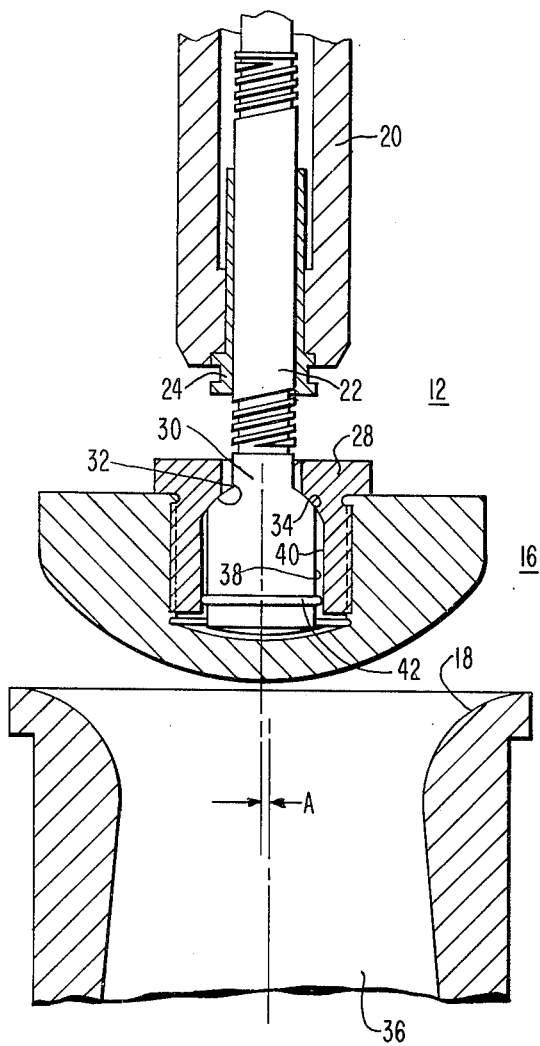
FIGS. 2 through 4 are partial sectional views of the present invention valve structure illustrating sequential positioning thereof during a normal closing cycle for misaligned components.

FIG. 2 illustrates such open, unseated position for valve structure 12. Valve body 16 and seat 18 have spherical, mateable surfaces which can accommodate misalignments therebetween by promoting "rolling" of valve body 16 on seat 18 until proper contact is obtained. FIG. 2 illustrates such a misalignment at A between the centerline of valve stem 22 and the centerline of seat 18. Valve body 16 includes valve plug 26 and valve nut 28 which is, by example, in threaded engagement therewith. Valve nut 28 and valve plug 26 cooperatively bound an opening which houses valve support body 30 which is an integral part of valve stem 22. Valve nut 28 and support body 30 have engageable, spherical bearing surfaces 32 and 34 which are engaged when the valve is in the illustrated, open position. Steam flow about valve plug 26 toward opening 36 can cause excessive vibration and possibly result in mechanical damage to valve structure 16 and components which are connected to and associated therewith. Guide surfaces 38 and 40 on the support body 30 and valve nut 28 are separated a predetermined distance necessary to permit relative movement between surfaces 32 and 34 during closure of a misaligned valve stem 22 and valve seat 18.

Stabilizing, anti-vibration ring 42, preferably attached to support body 30, is disposed in such separation space so as to substantially lie within the plane formed by the contact line between valve seat 18 and valve plug 26. Stabilizing ring 42 remains separated from valve nut 28 by a distance less than the normal separation space and greater than or equal to the distance guide surfaces 38 and 40 approach each other during closure of the misaligned valve plug 26 and valve seat 18. Stabilizing ring 42, due to its relative disposition between valve support body 30 and valve nut 28, substantially eliminates oscillatory vibration of valve plug 26 about the upper spherical support surfaces between valve nut 28 and valve support body 30 when plug 26 is in the unseated position. The cooperative relationship among stabilizing ring 42, valve support body 30, valve nut 28, valve plug 26, and valve seat 18 will be better understood by viewing FIGS. 3 and 4 in conjunction with FIG. 2 and considering those figures as a sequence of events during closure of valve apparatus 16.

Figure 3:
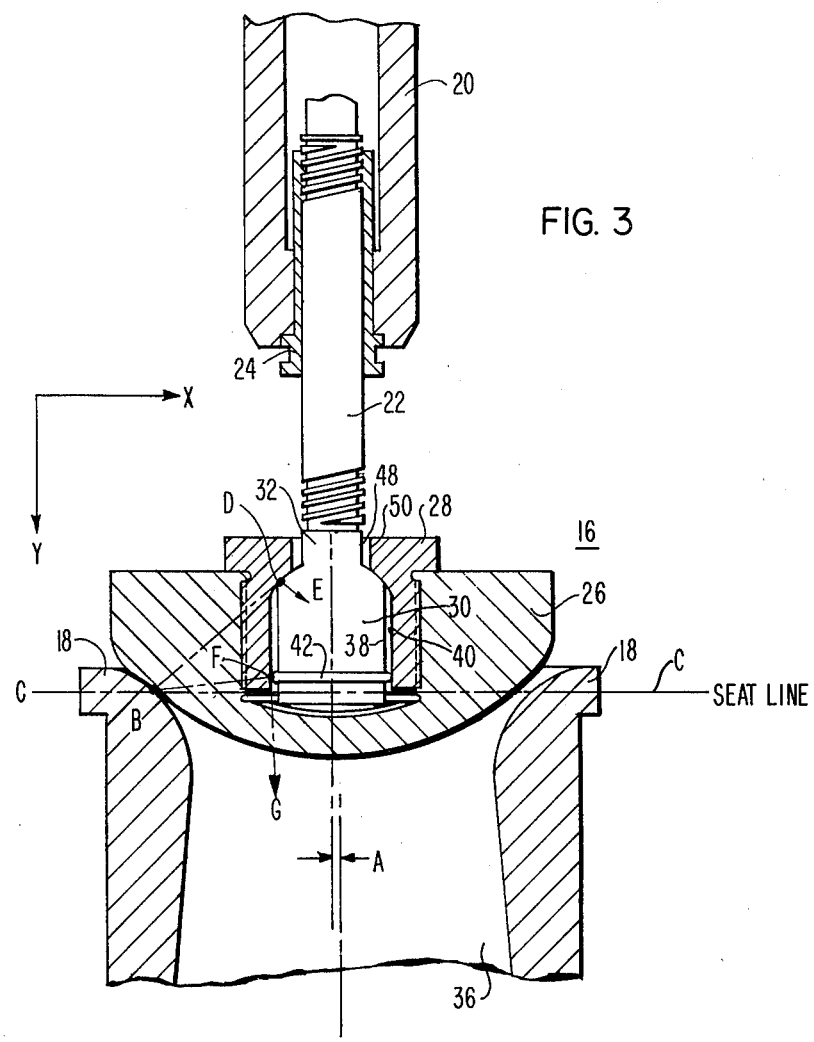

FIG 3 illustrates the valve configuration shown in FIG. 2 after valve structure 16 has initially contacted valve seat 18 at point B. Valve structure 16 alone looks virtually the same as it did in FIG. 2, but additional, closing movement of valve plug 26 and attached valve nut 28 will be rotational about contact point B while further movement of stem 22, valve support body 30, and stabilizing ring 42 will remain substantially vertically down. Such movement will continue until complete engagement of valve plug 26 and seat 18 is achieved along contact line CC. It can be shown that movement of any point in valve body 16 is in a direction perpendicular to a radius line connecting the point in question and rotation point B. As such, point D, on valve nut surface 32, will move in the direction indicated by arrow E which may be seen to have substantial X and Y components (as indicated above the valve), while point F on guide surface 40 of valve nut 28 has motion in the direction indicated by arrow G. As can be seen, vector G has a very small component in the X direction and a very large component in the Y direction which may be interpreted to mean that point F on valve body 16 moves horizontally a very insignificant distance and becomes even smaller as valve body 16 rotates into complete contact with valve seat 18. After valve plug 26 has initially contacted valve seat 18 at point B, further downward vertical motion of point D on valve nut surface 32 is restrained relative to the free downward vertical motion of point D on valve support body surface 34. Thus, as downward vertical motion of valve stem 22 and valve support body 30 continues, clearance is provided between the spherical surfaces at D, allowing unrestricted rotation of valve body 16 about valve seat contact point B. Motivation forces for this rotative seating action are provided by both weight and pressure drop forces acting on valve body 16 in the downward vertical direction. Due to such kinematic behavior, stabilizing ring 42 may be disposed in very close relationship with surrounding guide surface 40 and yet avoid restricting a rotation of valve body 16.

Figure 4:
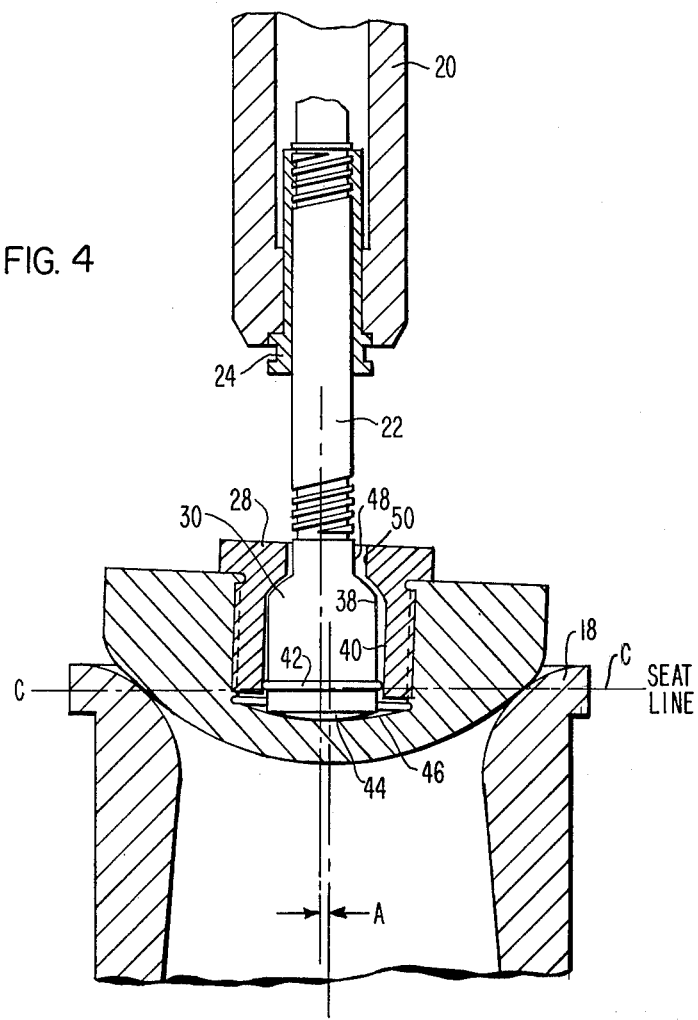

FIG. 4 illustrates complete sealing engagement of valve body 16 with valve seat 18 along contact line CC. Relative rotation of valve body 16 about valve support body 30 was permitted despite the relatively small separation distance between the stabilizing ring 42 and guide surface 40 prior to the valve's closure and subsequent sealing with the valve seat 18. Due to such close fitting relationship between stabilizing ring 42 and guide surface 40, vibration and unrestrained wobbling of valve body 16, while in the open position, is substantially eliminated due to the area contact between surfaces 32 and 34 and virtual line contact between stabilizing ring 42 and guide surface 40 as better illustrated in FIG. 2. Axial end 44 of support body 30 preferably constitutes a spherical surface 44 which is mateable with spherical inside valve plug surface 46 so as to ensure area contact therewith in the case when support body 30 impacts valve plug 26. The clearance between stabilizing ring 42 and guide surface 40 and valve nut 28 primarily dictated by toleranced accuracy in locating point F on stabilizing ring 42 in the horizontal plane of the seating line CC when valve body 16 is in the seated position. The clearance between surfaces 38 and 40 and surfaces 48 and 50 are primarily dictated by the maximum possible misalignment "A" between vertical center lines of valve stem 22 and fixed valve seat 18 and the spherical radius of the valve plug 26. For the illustrated case, the spherical radius of valve plug 26 equals approximately four inches, the maximum misalignment "A" is 0.1 inch, and the clearance between stabilizing ring 42 and guide surface 40 is 0.01 radial inches.

It will now be apparent that an improved control valve has been provided in which relatively large misalignments between the valve plug 26 and seat 18 have been accommodated while the valve 16's vibrational vulnerability during disengagement with valve seat 18 has been substantially eliminated.

We claim:

1. A vibration resistance valve apparatus comprising:
   a stem structure which is axially displaceable between an open and a closed position, said stem structure including an elongated stem and a support body attached to one end of said stem, said support body having a bearing surface and a guide surface;
   a valve seat structure having a spherical seat surface;
   a valve body having a spherical surface portion which is engageable with said seat surface for preventing fluid flow therebetween, said valve body having an opening therein for housing said support body, said valve body having a bearing surface and a guide surface which bound said opening, said valve body's bearing surface being rotatably supportable by said support body and said valve body's guide surface being separated from said support body; and
   a stabilizing ring being attached to one of said bodies and being unattached to the other body, said stabilizing ring extending into said separation between said guide surfaces of said valve body and said support body, said stabilizing ring being axially narrow compared to said guide surfaces' length, said stabilizing ring lying in a plane, wherein said plane is defined by the contact line between the spherical valve body and seat when said valve is engaged with said seat.

2. The vibration resistant valve apparatus of claim 1, wherein said engageable bearing surfaces have spherical shapes which permit relatively free movement and ensure surface contact therebetween.

3. The vibration resistant valve apparatus of claim 1, wherein said support body's engageable bearing surface is disposed on one axial end region of said support body and said stabilizing ring is axially separated therefrom toward the opposite axial end of said support body.

4. The vibration resistant valve apparatus of claim 1, wherein said stabilizing ring and unattached body are separated during non-engagement of the valve by a distance greater than or equal to the bodies' displacement toward each other during valve engagement with the seat.

5. The vibration resistant valve apparatus of claim 1, wherein said stabilizing ring substantially lies in the plane defined by the contact line between the spherical valve body and seat when said valve is engaged with said seat.

6. The vibration resistant valve apparatus of claim 1, said support body further comprising:
a spherical surface for mateably abutting said valve body to limit the stem structure's axial displacement in the closing direction.

7. The vibration resistant valve apparatus of claim 1, said valve body comprising a valve plug and a valve nut in threaded engagement therewith to permit axial adjustment of the valve body's extreme open and closed positions and to permit assembly and adjustment of the valve support body with said valve body, said valve nut having said valve body's bearing and guide surfaces.

* * * * *